US011331691B2

(12) United States Patent
Chung et al.

(10) Patent No.: US 11,331,691 B2
(45) Date of Patent: May 17, 2022

(54) APPARATUS AND METHOD OF MANUFACTURING TOW PREPREG

(71) Applicants: HYUNDAI MOTOR COMPANY, Seoul (KR); KIA MOTORS CORPORATION, Seoul (KR)

(72) Inventors: Jae Han Chung, Incheon (KR); Yong Min Park, Seoul (KR); No Hyun Park, Jeonju-si (KR); Yean Jung Jeong, Jeonju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/809,561

(22) Filed: Nov. 10, 2017

(65) Prior Publication Data

US 2018/0297055 A1    Oct. 18, 2018

(30) Foreign Application Priority Data

Apr. 13, 2017 (KR) .......................... 10-2017-0047787

(51) Int. Cl.
| | |
|---|---|
| *B05C 1/08* | (2006.01) |
| *B05C 3/02* | (2006.01) |
| *B29C 70/50* | (2006.01) |
| *B05D 1/28* | (2006.01) |
| *B29B 15/12* | (2006.01) |

(52) U.S. Cl.
CPC .................. *B05D 1/28* (2013.01); *B05C 1/08* (2013.01); *B05C 1/086* (2013.01); *B05C 3/02* (2013.01); *B29B 15/122* (2013.01); *B29C 70/504* (2013.01)

(58) Field of Classification Search
None
See application file for complete search history.

(56) References Cited

U.S. PATENT DOCUMENTS 3,284,870 A * 11/1966 Griffin ...................... D06B 3/18
                                                                    28/183
4,022,151 A *  5/1977 Achelpohl ............ B05C 1/0826
                                                                    118/33

(Continued)

FOREIGN PATENT DOCUMENTS

| CN | 101439586 A | 5/2009 |
| CN | 101462361 A | 6/2009 |

(Continued)

OTHER PUBLICATIONS

Angelos Miaris, Modeling the Impregnation Process of a Siphon Impregnation System During Filament Winding, Proceedings of the ASME 2011 Pressure Vessels & Piping Division Conference PVP2011 Jul. 17-21, 2011, Baltimore, Maryland, USA (Year: 2011).*

*Primary Examiner* — Binu Thomas
(74) *Attorney, Agent, or Firm* — Morgan, Lewis & Bockius LLP (57) ABSTRACT

An apparatus for manufacturing tow prepreg includes: a spreading roller which adjusts an incident angle of supplied fiber; and two or more coating rollers including a first roller and a second roller which rotate while having a gap between the first roller and the second roller, in which the fiber supplied from the spreading roller passes through the gap between the first roller and the second roller to be coated with resin. The incident angle of the fiber supplied for immersing the resin is adjusted to adjust tension applied to the fiber supplied to a coating roller, such that the quantity of the resin of the tow prepreg can be controlled more precisely.

12 Claims, 3 Drawing Sheets

(56) References Cited

U.S. PATENT DOCUMENTS

| | | | |
|---|---|---|---|
| 5,607,531 A | | 3/1997 | Needham et al. |
| 5,607,728 A | * | 3/1997 | Bremmer ............... B05C 1/0826 |
| | | | 118/110 |
| 5,634,477 A | * | 6/1997 | Ogura ................... B05C 1/0865 |
| | | | 131/35 |
| 5,702,760 A | * | 12/1997 | Kustermann ......... B05C 1/0826 |
| | | | 118/223 |
| 2012/0100335 A1 | | 4/2012 | Ellis et al. |
| 2012/0251823 A1 | * | 10/2012 | Maldonado ........... B29B 15/122 |
| | | | 428/367 |

FOREIGN PATENT DOCUMENTS

| | | |
|---|---|---|
| CN | 103921455 A | 7/2014 |
| CN | 104924487 A | 9/2015 |
| DE | 68909661 T2 | 2/1994 |
| DE | 10147303 A1 | 4/2003 |
| DE | 102015204430 A1 | 9/2016 |
| EP | 0674851 A1 | 10/1995 |
| JP | S59-014924 A | 1/1984 |
| JP | H07-016835 A | 1/1995 |
| JP | H08-169014 A | 7/1996 |
| JP | 2000-264985 A | 9/2000 |
| JP | 2002-046937 A | 2/2002 |
| JP | 4924202 B2 | 4/2012 |
| JP | 2014-148573 A | 8/2014 |
| KR | 10-1609209 B1 | 4/2016 |

* cited by examiner

APPARATUS AND METHOD OF MANUFACTURING TOW PREPREG

CROSS-REFERENCE TO RELATED APPLICATION

This application is based on and claims the benefit of priority to Korean Patent Application No. 10-2017-0047787 filed on Apr. 13, 2017 with the Korean Intellectual Property Office, the entire contents of which are incorporated herein by reference.

TECHNICAL FIELD

The present disclosure relates to an apparatus and a method of manufacturing tow prepreg, and more particularly to an apparatus and a method of manufacturing tow prepreg which is usable as a material of a pressure vessel for a fuel cell vehicle.

BACKGROUND

A pressure vessel for storing high pressure gas needs a material which is basically strong and has a characteristic that resists to high pressure, and particularly, in order to improve fuel efficiency and performance of a fuel cell vehicle, lightness of a structure is essential. An application of a light and strong carbon fiber composite material is one of the most effective methods replacing a pressure vessel formed of a metal.

The pressure vessel formed of the composite material is manufactured by a filament winding method. The filament winding method may easily manufacture a structure having a circular shape or a curvature by integral molding, and intensively reinforce fiber in a load transmission direction, thereby having an advantage of maximizing performance of the composite material. The filament winding method is a composite material molding method of manufacturing a rotationally symmetric structure by winding continuous fiber, in which resin is impregnated, around a rotating mold (mandrel) shaped like a cylinder and hardening the continuous fiber. The filament winding method may adopt a wet winding method, in which a filament is impregnated while passing through a resin bath immediately before reinforced fiber is wound around the mold, and a dry winding method using tow prepreg.

In the wet winding method, which is currently applied to most manufacturing processes of a pressure vessel, viscosity of a resin needs to be very low according to a characteristic of a process, in which the resin is impregnated in the reinforced fiber and is wound around the mold at the same time. Accordingly, it is difficult to combine various resins and apply an additive, such that it is difficult to implement various properties of the resin. Moreover, by the same reason, a slip phenomenon is generated during the winding, such that it is difficult to wind a complex pattern. Further, a fiber arrangement is not uniform, so that reproducibility and reliability of the fiber are relatively low, and a work place is contaminated due to a usage of a liquid resin, thereby causing a poor manufacturing environment. Further, since the reinforced fiber and the resin are impregnated in a pressure vessel producing site, it is difficult to uniformly adjust a volume ratio of the reinforced fiber and the resin, and a defect of a volume ratio product quality may cause a defect of the pressure vessel itself.

In the meantime, the dry winding method uses tow prepreg as an intermediary such that a resin is impregnated in reinforced fiber with a predetermined volume radio in advance. When the tow prepreg is used, a separate resin immersion process can be omitted, so that it is possible to manufacture a pressure vessel with a simple and clean process. Further, since the intermediary is produced with an accurate volume ratio in advance, it is possible to prevent causing a defect of a volume ratio of the pressure vessel. Further, since a resin having higher viscosity than a resin applied to the wet winding process is applied, a surface of the tow prepreg may have an adhesive property and the lower mandrel and the surface of the wound tow prepreg can be bonded, thereby preventing the resin from slipping during the winding, and precisely manufacturing the pressure vessel which may be designed in various patterns. Due to the reasons described above, the tow prepreg has received attention as a core material for a next generation of a composite pressure vessel.

A method of manufacturing the tow prepreg is divided into a solvent process and a hot melt process.

The solvent process is a process of giving fluidity to the resin by diluting a resin with high viscosity in a solvent, which can melt a resin, in order to impregnate the resin in reinforced fiber, immersing the diluted resin in the reinforced fiber, and then drying and removing the solvent to manufacture the tow prepreg, and the manufacturing process thereof is simple. However, the solvent process is difficult to precisely control a volume ratio of the resin and the reinforced fiber of the tow prepreg, so that it is actually difficult to completely remove a volatile matter within the tow prepreg during the drying process. The residual volatile matter within the tow prepreg is gasified during a molding/hardening process to form a void, thereby causing a problem in that performance of a molded product is considerably degraded, and due to this reason, the tow prepreg manufactured by the solvent process is hardly applied to a high performance composite material including a high pressure vessel.

By contrast, the hot melt process is a method of generating fluidity by heating a resin with high viscosity and immersing the resin in reinforced fiber, so it is possible to manufacture tow prepreg having little volatile matters. Accordingly, the hot melt process may precisely control a volume ratio of the resin and the reinforced fiber, and may be therefore a manufacturing process appropriate to manufacture tow prepreg applicable to a composite material product requiring high reproducibility, reliability, and performance. However, a standard for the manufacturing technology of the tow prepreg, to which the hot melt process is applied, has not been currently established, and a research and development activity is slight. Further, it is known that production efficiency of a manufacturing company commercializing hot melt tow prepreg is low, and by the reason, a price of a material is very high, so that it is hard to earnestly apply tow prepreg to the mass production of a composite material product. Accordingly, a development of an apparatus and a process of precisely and efficiently manufacturing tow prepreg is urgently demanded.

In the related art, in order to manufacture tow prepreg by using the hot melt process, a prepreg slitting method and a resin film transfer method which are the existing hot melt type prepreg manufacturing methods are used.

The prepreg slitting method is a method of manufacturing tow prepreg by cutting previously manufactured prepreg having a long width of 200 to 1,000 mm into prepreg having a desired width, and then re-winding the prepreg, and equipment necessary for the manufacturing is cheap and the manufacturing method thereof is also comparatively simple.

However, since fiber is damaged during the process of slitting the prepreg, single yarn may be generated at a boundary of the manufactured tow prepreg, so that it is difficult to expect high performance when the tow prepreg is applied to a molded product.

The resin transfer method has an advantage in that it is possible to precisely control resin contents, but a manufacturing process thereof having multiple steps is complex, and equipment for the manufacturing process is expensive. Since a sub material, such as a release paper and a release film, is used during the manufacturing of the tow prepreg, production cost of a product increases, thereby weakening price competitiveness of a composite material using the tow prepreg.

For the reasons stated above, there is a demand for a development of a manufacturing process of tow prepreg by using a direct coating method, in which fiber damage is minimal, production equipment and manufacturing process are simple, and a sub material is not used. The direct coating method is a process of manufacturing tow prepreg, in which reinforced fiber directly meets a hot melted resin and the resin is impregnated, without a separate filming process or prepreg manufacturing process, and a coating technology which is capable of minimizing single yarn of the reinforce fiber within a short time is a core of the process.

For example, in US Patent Application Publication No. 2012-0251823 (hereinafter, Patent 823), a resin is impregnated between strands of carbon fiber by controlling the quantity of resin coated on carbon fiber by adjusting an gap between two coating rollers, which are capable of heating resin supplied to a coating zone and are formed of a metal material, and then giving fluidity to the resin by applying high temperature heat for a short time, for which the resin passes through an immersion zone. Then, a width of the carbon fiber, in which the resin is impregnated, is controlled by using a cooling roller in a cooling zone, and appropriate viscosity is given to complete and manufacture tow prepreg.

In order to adjust the content of resin of the tow prepreg, Patent 823 suggests the method of controlling the gap between the two coating rollers, but it is difficult to precisely adjust the content of resin only with the two coating rollers. Further, particularly when tow prepreg having a low quantity of resin is manufactured, a gap between the two coating rollers needs to be considerably decreased, and in this case, excessive pressure is applied to the carbon fiber positioned between the metal rollers, so that the carbon fiber is crushed and disconnected. Further, when tow prepreg having the low quantity of resin is manufactured, a gap between the two coating rollers is small, and thus the quantity of resin passing through the coating roller is small so that the resin cannot sufficiently permeate into the gap between strands of the carbon fiber. Accordingly, it is necessary to promote the immersion of the resin by increasing a temperature of a resin immersion zone or increasing a length of a section. However, a hardener is mixed in the resin for the tow prepreg, so that, when a temperature is excessively high and an exposure time to the high temperature is increased, there is a problem in that hardening starts.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with prior art and to provide an apparatus and a method of manufacturing tow prepreg, which set a control factor for controlling the content of resin of tow prepreg and vary the control factor, thereby precisely controlling the contents of resin of the tow prepreg and preventing damage, such as single yarn and thermal damage, to a product.

In one aspect, the present disclosure provides an apparatus for manufacturing tow prepreg, the apparatus including: a spreading roller which adjusts an incident angle of supplied fiber; and two or more coating rollers including a first roller and a second roller which rotate while having a gap between the first roller and the second roller, in which the fiber supplied from the spreading roller passes through the gap between the first roller and the second roller to be coated with a resin.

In a preferred embodiment, the spreading roller may be formed to be shiftable such that a mounting position of the spreading roller is changed.

In another preferred embodiment, the spreading roller may be shiftable between a first position, at which the fiber is vertically supplied to the gap between the first roller and the second roller, and a second position, at which a predetermined maximum incident angle is formed, and may be fixed at a shifted position.

In still another preferred embodiment, the spreading roller may adjust an incident angle of the fiber from 0° to 30°.

In yet another preferred embodiment, the first roller and the second roller may be formed of different materials, and either the first roller or the second roller may have a surface formed of an elastic material.

In still yet another preferred embodiment, either the first roller or the second roller, other than the roller having a surface formed of an elastic material, may have a surface formed of a non-elastic material.

In a further preferred embodiment, the apparatus may further include a third roller forming a gap between the second roller and the third roller, in which the fiber passes through the gap between the second roller and the third roller, and the third roller may have a surface formed of a same material as a material of the surface of the first roller.

In another further preferred embodiment, the material of the surfaces of the first roller and the third roller may be rubber, and the material of the surface of the second roller may be metal.

In still another further preferred embodiment, the material of the surfaces of the first roller and the third roller may be metal, and the material of the surface of the second roller may be rubber.

In yet another further preferred embodiment, the gap between the first roller and the second roller may be larger than the gap between the second roller and the third roller.

In still yet another further preferred embodiment, the apparatus may further include: a transfer device which transfers the spreading roller; and a controller which adjusts a position of the spreading roller by controlling the transfer device, in which the controller may have a data table showing that an incident angle of the fiber is matched with content of resin, and the incident angle of the fiber may be determined by the data table or be directly input to the data table.

In a still further preferred embodiment, the apparatus may further include: a krill around which the fiber is wound such that the fiber is supplied to the spreading roller; and a guide roller which is installed between the krill and the spreading roller to guide supply of the fiber.

In a yet still further preferred embodiment, the apparatus may further include: a heater which heats the fiber passing through the two or more coating rollers; a cooling roller which cools the fiber passing through the heater; and a winder which winds the fiber passing through the cooling roller.

In another aspect, the present disclosure provides a method of manufacturing tow prepreg, the method including: step A of setting an incident angle of fiber supplied from a spreading roller to two or more coating rollers including a first roller and a second roller; step B of shifting the spreading roller according to the set incident angle; and step C of supplying the fiber to the two or more coating rollers to continuously coat the supplied fiber with resin.

In a preferred embodiment, the incident angle of the fiber may be set from 0° to 30°.

In another preferred embodiment, step A of setting an incident angle of fiber may include inputting data of content of the resin to a controller, and the controller may determine the incident angle of the fiber according to a data table showing that the incident angle of the fiber is matched with the content of the resin.

In still another preferred embodiment, step C of supplying the fiber to the two or more coating rollers and continuously coating the supplied fiber with a resin may include supplying the resin to a gap between the first roller and the second roller formed of different materials and coating the fiber passing through the gap with the resin.

In yet another preferred embodiment, the method may further include removing a portion of the coated resin to decrease the content of the resin by passing the coated resin through a gap between the second roller and a third roller which are formed of different materials.

In still yet another preferred embodiment, the method may further include heating the coated resin.

In a further preferred embodiment, the method may further include cooling and winding the coated resin.

The apparatus and the method of manufacturing tow prepreg according to the exemplary embodiments of the present disclosure have the effects described below.

Firstly, the gap between the first and second rollers is independent from the gap between the second and third rollers, so that even though tow prepreg with the low quantity of resin is manufactured, the sufficient quantity of resin is first coated between the strands of the carbon fiber by increasing the gap between the first and second rollers and then the resin, in which the desired quantity of resin is excluded, is squeezed through the second and third coating rollers, thereby manufacturing tow prepreg having the high degree of immersion with the low quantity of resin.

Secondly, it is possible to uniformly coat and impregnate the resin through the coating rollers, and decrease an additional heat treatment time through the heater, thereby minimizing thermal damage to the resin of the tow prepreg and improving storage life and performance of a product.

Thirdly, in the case of the rubber and metal coating rollers, even though a gap between the coating rollers is 0, single yarn is not generated, so that it is possible to manufacture tow prepreg with the lower content of resin (20 to 25%).

Fourthly, it is possible to adjust the degree of spreading of carbon fiber supplied to the coating roller by adjusting a position and an angle of the spreading roller, thereby continuously manufacturing tow prepreg having a high degree of immersion and having small single yarns.

Fifthly, it is possible to adjust the content of resin of tow prepreg by adjusting a gap between the two adjacent coating rollers and adjust the quantity of resin coated by adjusting a position of the spreading roller, thereby more precisely controlling the quantity of resin of the tow prepreg.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present disclosure presents an apparatus and a method of manufacturing tow prepreg, in which an incident angle of fiber supplied for immersing resin is adjusted to adjust tension applied to the fiber supplied to a coating roller, thereby adjusting the content of resin. An object of the present disclosure is to manufacture tow prepreg, and the present disclosure is given on the basis that a resin is impregnated in carbon fiber. However, within a range without departing from the principal of the present disclosure, the present disclosure may be expanded to the case where a resin is impregnated in another fiber.

An example described with reference to the accompanying drawings is an exemplary embodiment, and a configuration of the manufacturing apparatus is not limited to the presented example. Accordingly, the invention described in the claims is not limited to the present exemplary embodiment, and those skilled in the art may understand that it shall be construed that the invention described in the claims includes examples, in which the number and the disposition of rollers, an arrangement of processes, and the like are appropriately changed.

Hereinafter, an apparatus and a method of manufacturing tow prepreg according to an exemplary embodiment of the present disclosure will be described in detail with reference to the accompanying drawings.

Figure 1:
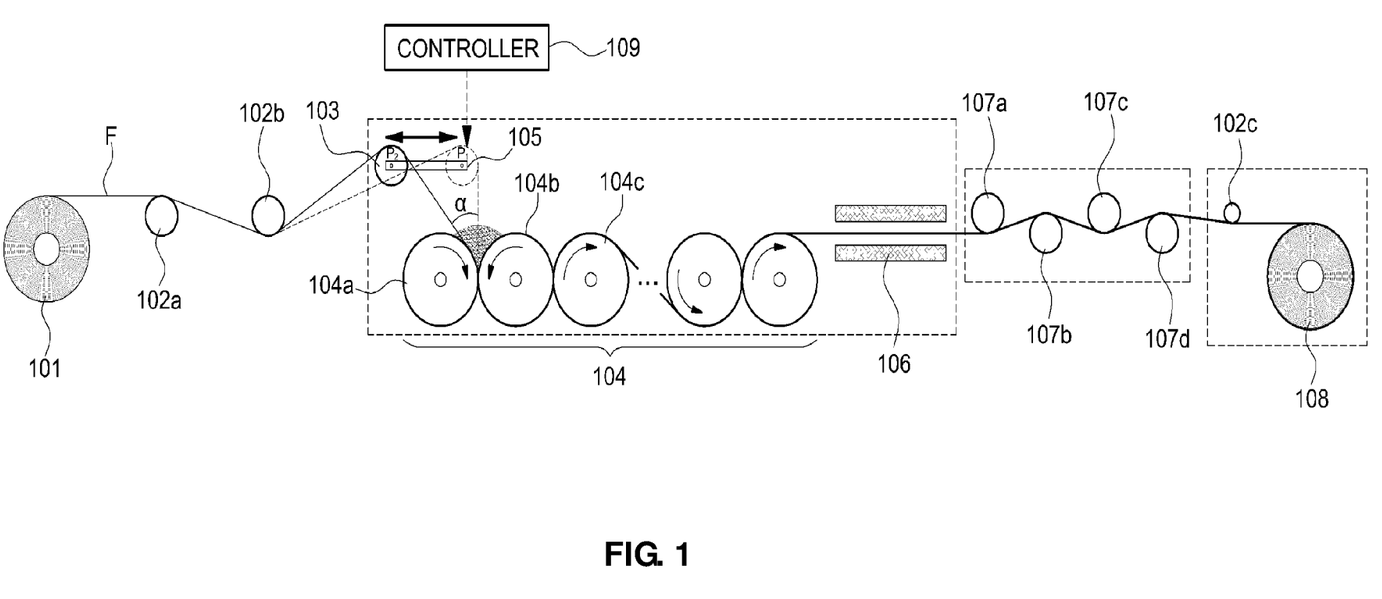
FIG. 1 is a diagram illustrating an apparatus for manufacturing tow prepreg according to an exemplary embodiment of the present disclosure.

As illustrated in FIG. 1, an apparatus for manufacturing tow prepreg according to an exemplary embodiment of the present disclosure is divided into a fiber supply section for supplying a resin, a resin immersion section for immersing the resin in supplied fiber, a cooling section for cooling the fiber, in which the resin is impregnated, and completing a form of the fiber, and a winding section for completing wound tow prepreg.

In the fiber supply section, fiber, such as carbon fiber, is wound, and a krill 101 which supplies the fiber into equipment for immersing a resin in the fiber, and a spreading roller 103 for adjusting an incident angle of the supplied fiber are included. Further, as illustrated in FIG. 1, a plurality of guide rollers 102a and 102b for guiding the supplied fiber may be installed between the krill 101 and the spreading roller 103.

The spreading roller 103 may be installed at a just front end of a coating roller 104 and may be configured so that an incident angle of the fiber supplied to the coating roller 104 is changed according to a change in a position of the spreading roller 103.

In the meantime, in the resin immersion section, at least two coating rollers 104 including a first roller 104a and a second roller 104b which rotate while having a gap therebetween through which the fiber supplied from the spreading roller passes are provided. As illustrated in FIG. 1, the gap for is formed between the first roller 104a and the second roller 104b, and the resin is supplied to an upper side of the gap. Accordingly, when the fiber is supplied to the gap between the first roller 104a and the second roller 104b through the spreading roller 103, a hot melt resin is preferentially supplied to a space formed by the first roller 104a and the second roller 104b in an upper region of the gap, that is, an upper portion of the gap.

Accordingly, the hot melt resin is preferentially supplied through a resin supply unit (not illustrated) before the fiber is supplied to the coating roller 104, so that the fiber passing through the coating roller 104 may be coated with the resin. Further, in the resin immersion section, in order to additionally impregnate the resin, the present disclosure further includes a heater 106 for supplying heat to the fiber.

The fiber passing through the resin immersion section is cooled while passing through the cooling roller 107 of the cooling section to have a completed form. Then, the cooled fiber is wound around a pipe by a winder 108 through a guide roller 102c at a rear end of the equipment to complete tow prepreg.

Figure 2:
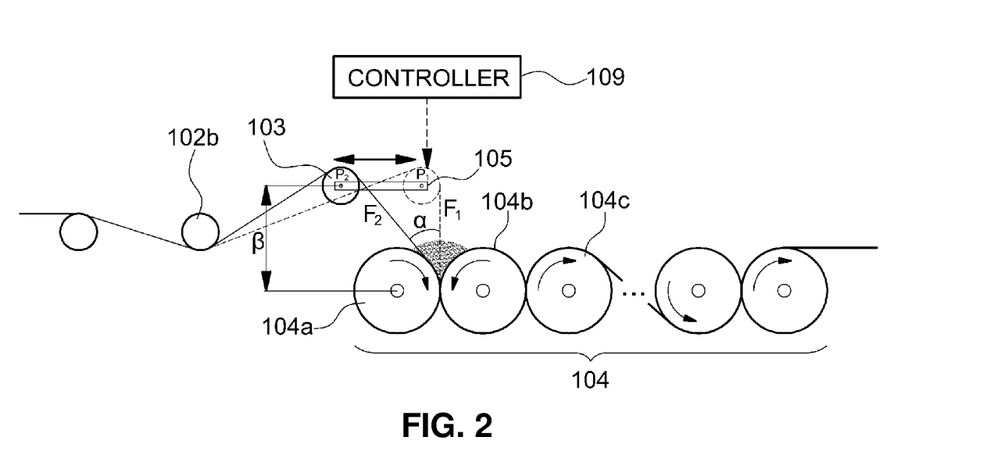
FIG. 2 is a diagram illustrating only configurations of a spreading section and a coating section extracted from FIG. 1.

In the meantime, FIG. 2 illustrates an enlarged view of a neighboring region of the spreading roller 103 and the coating roller 104 in the fiber supply section and the resin immersion section in the exemplary embodiment of FIG. 1.

When the carbon fiber unwound from the krill 101 directly enters the resin immersion section for coating and immersing the resin without spreading, the resin may be easily coated only on a surface of the carbon fiber. This may cause an immersion defect of the tow prepreg, so that the strands of the carbon fiber supplied to the coating roller 104 may be spread in advance. In the related art, in order to spread the carbon fiber, a method of making the carbon fiber alternately pass through the plurality of concave or convex rollers or a method of mechanically shaking the carbon fiber is used, but a curvature is set in each roller in the method using the roller, so that it is difficult to react a change in a production condition, and the carbon fiber is damaged due to friction in the method of mechanically shaking the roller, so that a property of tow prepreg may be degraded.

In the meantime, the present disclosure is characterized in that the spreading roller 103 is movably designed and a position of the spreading roller 103 is changed. As illustrated in FIG. 2, an incident angle of the carbon fiber may be adjusted according to a shift of the spreading roller 103, thereby adjusting tension applied to the carbon fiber.

In the exemplary embodiment of the present disclosure, the present disclosure further includes a transfer device 105 for shifting the spreading roller 103 and a controller 109, which is an electric circuitry that executes instructions of software which thereby performs various functions for adjusting a position of the spreading roller 103 by controlling the transfer device 105. In this case, the controller 109 has a data table showing an incident angle of the fiber is matched with the content of resin, and the incident angle of the fiber may be determined by the data table or an operator may directly input the incident angle of the fiber.

Accordingly, the operator inputs the incident angle or the content of resin of the fiber, so that the degree of spreading of the carbon fiber inserted into the coating roller 104 may be continuously controlled.

Particularly, a principle of adjusting the degree of spreading is described below. When it is assumed that tension applied to the carbon fiber (that is, the fiber passing through the spreading roller positioned at a position $P_1$ and indicated with a dotted line in FIG. 2) vertically passing through the gap between the two coating rollers (the first roller and the second roller) operated by predetermined torque is $F_1$, tension $F_2$ applied to the carbon fiber (that is, the fiber passing through the spreading roller positioned at $P_2$ and indicated with a solid line in FIG. 2) when an incident angle is adjusted by α has a relationship described below.

$$F_2 = F_1/\sin\alpha\ (0 \le \alpha < 90°)$$

Accordingly, the tension applied to the fiber may be adjusted according to the adjustment of the incident angle α, and the quantity of resin impregnated may be adjusted according to the tension applied to the fiber. Particularly, when the tension applied to the fiber is low, the carbon fiber is easily pressed and spread together with the resin when passing through the gap between the two coating rollers, thereby evenly immersing the resin between the fibers. In the meantime, when the tension applied to the carbon fiber is high, the fiber is not easily spread and the quantity of resin coated on the fiber is decreased, thereby producing a product with the low content of resin.

The spreading roller 103 is shiftable between the first position $P_1$, at which the fiber is vertically supplied to the gap between the first roller 104a and the second roller 104b, and the second position $P_2$, at which the fiber may form a predetermined maximum incident angle, and may be fixed at a shifted position.

In this case, a preferable incident angle of fiber is $0 \leq \alpha < 30°$, and when the incident angle is 30° or more, the fiber is pulled by high tension and is thickly collected, so that when the fiber passes through the narrow gap between the coating rollers, the fiber may be damaged.

In the meantime, the carbon fiber spread through the spreading roller 103 passes through the two or more coating rollers 104 including the first roller 104a and the second roller 104b positioned at a rear end of the equipment.

The first roller 104a and the second roller 104b are formed of different materials, and a surface of the first roller 104a or the second roller 104b is formed of an elastic material. Herein, the reason why any one of the first roller 104a and the second roller 104b is formed to have an elastic surface is to decrease a gap between the first roller 104a and the second roller 104b. For example, when the carbon fiber passes through the gap between the coating rollers formed of a non-elastic metal, the carbon fiber may be broken by the hard coating roller and single yarn may be generated. However, in the case of the roller of which the surface is formed of the elastic material, even though a gap between the two coating rollers is set to be very small, single yarn is rarely generated when the carbon fiber passes through the gap, so that it is possible to manufacture tow prepreg having the lower content of resin compared to that of the metal-metal rollers.

Figure 3A:
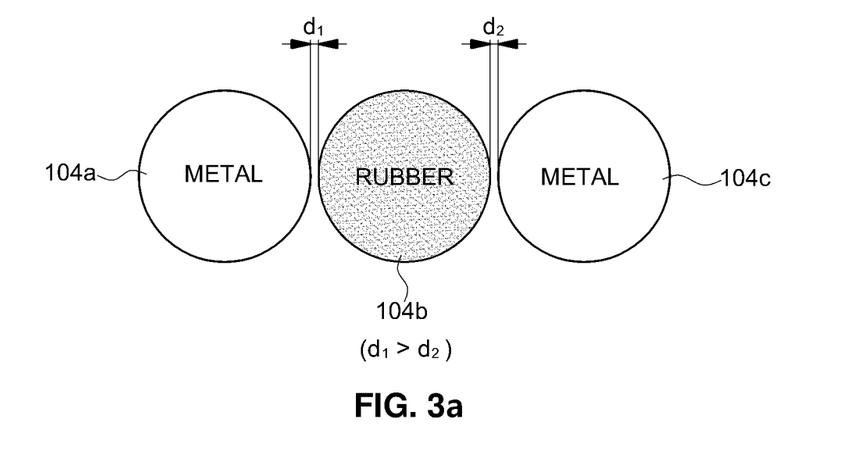
FIG. 3A is a diagram illustrating a configuration of a coating roller according to an exemplary embodiment of the present disclosure.
Figure 3B:
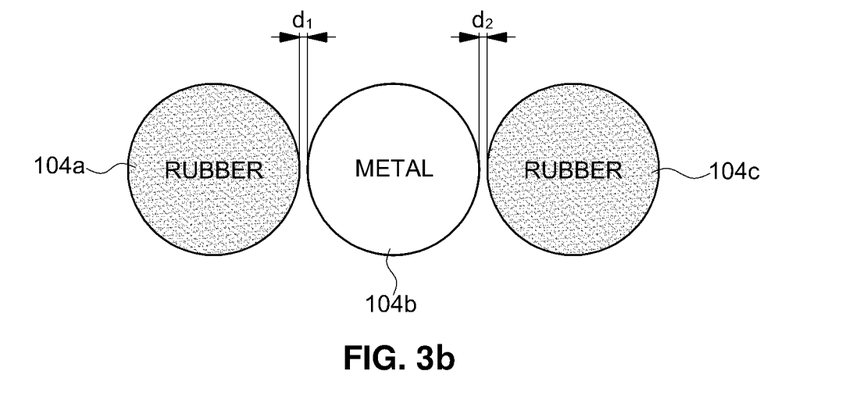
FIG. 3B is a diagram illustrating a configuration of a coating roller according to another exemplary embodiment of the present disclosure.

In this case, the material of the surface of the coating roller 104 may be set so that rubber and metal are alternately arranged. For example, as illustrated in FIGS. 3A and 3B, the arrangement of the coating rollers may be the metal-rubber-metal coating rollers or the rubber-metal-rubber coating rollers, and in consideration of productivity, in order to decrease a heating time, the metal-rubber-metal rollers may be more preferable.

The first roller 104a and the second roller 104b that are the two front rollers among the plurality of coating rollers sufficiently supply the resin and the resin is squeezed from the rear rollers, that is, the second roller 104b and the third roller 104c, so that even when tow prepreg having the low content of resin is manufactured, it is possible to supply the sufficient quantity of resin between the fiber strands at an initial stage. However, the fiber may be damaged by friction between the roller and the fiber while passing through the gaps among the plurality of rollers, so that it is preferable to use three or less rollers.

A gap $d_1$ between the first roller 104a and the second roller 104b may be set to be larger than a gap $d_2$ between the second roller 104b and the third roller 104c. The coated resin passing through the first gap between the first roller 104a and the second roller 104b passes through a narrower gap formed between the second roller 104b and the third roller 104c, so that the coated resin is squeezed to decrease the content of resin.

The gap between the first roller 104a and the second roller 104b and the gap formed between the second roller 104b and the third roller 104c may be adjusted by an operator as necessity. To this end, the present disclosure may include a driving unit which is capable of changing a position of the roller so as to adjust the gaps between the respective rollers or the gaps of at least some of the rollers. Accordingly, it is possible to more precisely control the content of resin by adjusting the gaps between the respective rollers by the driving unit, together with controlling the incident angle by the spreading roller 103. In this case, in regards to the data table included in the controller 109, the plurality of data tables according to the gap between the rollers may be included.

Table 1 below is data based on which it can be seen that the content of resin of the tow prepreg is changed according to an adjustment of an incident angle with respect to the carbon fiber.

TABLE 1

| | Incident angle ($\alpha$) | Content of resin |
|---|---|---|
| 1 | 0° | 32.3% |
| 2 | 10° | 31.8% |
| 3 | 15° | 31.1% |
| 4 | 20° | 30.1% |
| 5 | 25° | 28.9% |
| 6 | 30° | 27.2% |

(Gap between the first roller and the second roller: 0.2 mm, gap between the second roller and the third roller: 0.135 mm, β=220 mm)

TABLE 2

| | Gap between second roller and third roller | Content of resin |
|---|---|---|
| 1 | 0.135 mm | 30.1% |
| 2 | 0 | 23.4% |

(Incident angle ($\alpha$): 20°, gap between the first roller and the second roller: 0.2 mm)

Figure 4:
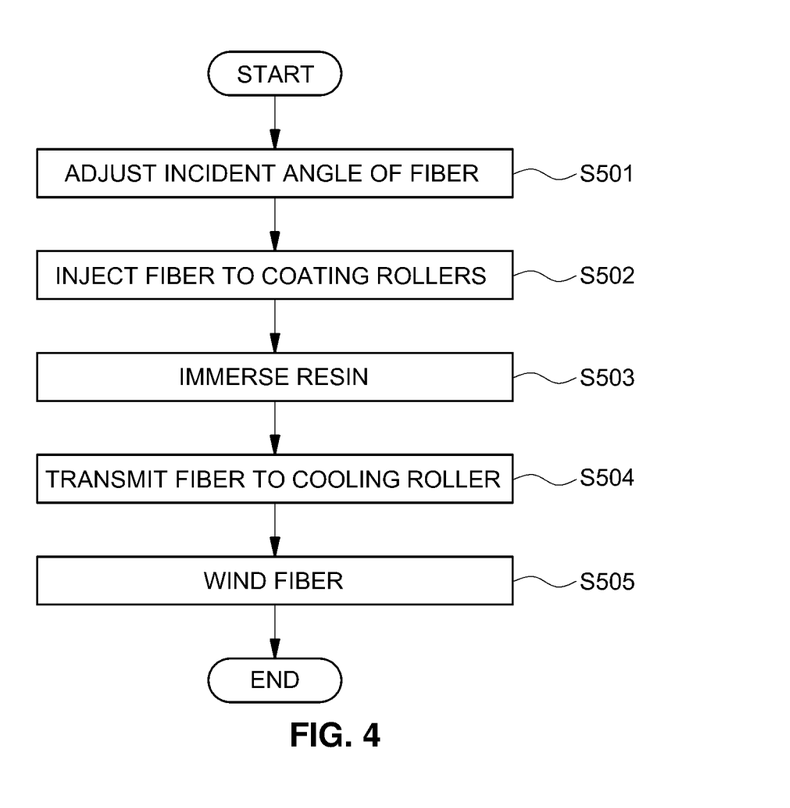
FIG. 4 is a diagram illustrating a method of manufacturing tow prepreg according to the present disclosure.

In the meantime, FIG. 4 is a diagram illustrating an example of a method of manufacturing tow prepreg according to an exemplary embodiment of the present disclosure.

As illustrated in FIG. 4, the method of manufacturing tow prepreg according to the exemplary embodiment of the present disclosure includes: adjusting an incident angle of fiber (S501), injecting the fiber into coating rollers (S502), coating the fiber with resin and immersing the resin (S503), transmitting the fiber to a cooling roller and fixing a shape of the fiber (S504), and winding the fiber, in which the resin is impregnated, and finally completing tow prepreg (S505).

Particularly, the adjusting of the incident angle of the fiber (S501) may include setting an incident angle of the fiber supplied to the coating rollers from the spreading roller 103 and shifting the spreading roller according to the set incident angle. After the incident angle is adjusted as described above, the fiber is supplied to the coating roller and the supplied fiber is continuously coated with the resin.

In this case, the setting of the incident angle of the fiber includes inputting data of the content of resin to the controller 109, and the controller 109 may determine the incident angle of fiber according to the data table showing the incident angle of the fiber is matched with the content of resin.

In the coating of the resin, the resin is supplied to the gap between the first roller and the second roller, so that the fiber passing through the gap is primarily coated with the resin, and the coated resin passes through the gap between the second roller and the third roller, so that a part of the coated resin is removed and the content of resin is decreased.

In the meantime, although not illustrated in FIG. 4, as described above, the method may further include additionally immersing the resin in a contactless method by heating the coated resin.

EXAMPLE 1

Carbon fiber was mounted in the krill 101, the fiber was unwound, and the fiber passed through the rollers in the fiber supply section, in which the rollers are heated at 80° C., to heat and spread the carbon fiber.

In order to manufacture tow prepreg, which is generally used and has the content of resin of 30%, a width of the fiber passing through the spreading roller was controlled so that α is 20°.

The fiber passes through a gap between a first roller (metal) and a second roller (rubber) heated at 80° C. In this case, a gap between the two coating rollers was set to 0.2 mm so that the resin is sufficiently coated between strands of the carbon fiber. Next, a gap between the second roller and the third roller, which are heated at 80° C., was set to 0.135 mm, and in this case, in consideration of an influence by a flow of the resin, the gap between the second roller and the third roller was adjusted so that a width of the fiber passing through the gap between the second and third rollers is maintained with 1.5 mm. An additional immersion used a heater spaced apart from the fiber by 50 mm by using a contactless method. In this case, a temperature of a heat source was 130° C. and a length of the heat source was set with 500 mm (in consideration of a production speed of 10 mm per minute). In order to complete the form, the carbon fiber, in which the resin is impregnated, passed through the gap between the cooling rollers set to 10° C., the gap between the cooling rollers was adjusted to set a desired width through an adjustment of tension applied to the fiber, and the fiber was wound around a pipe through a winding device to complete tow prepreg.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for manufacturing tow prepreg, the apparatus comprising:
   a spreading roller which adjusts an incident angle of supplied fiber so as to adjust tension applied to the fiber, wherein a quantity of a resin impregnated is adjusted according to the tension applied to the fiber;
   two or more coating rollers including a first roller and a second roller which rotate while having a first gap between the first roller and the second roller;
   a transfer device which transfers the spreading roller; and
   a controller which adjusts a position of the spreading roller by controlling the transfer device,
   wherein the fiber supplied from the spreading roller passes through the first gap between the first roller and the second roller to be coated with the resin,
   the two or more coating rollers further include a third roller having a second gap between the second roller and the third roller, through which the fiber passes,
   the controller is configured to determine the incident angle of the fiber and the first gap by one or more data tables showing relationships between the incident angle of the fiber, the quantity of the resin, and the first gap between the first roller and the second roller, and
   the first gap is larger than the second gap.

2. The apparatus of claim 1, wherein the spreading roller is formed to be shiftable such that the position of the spreading roller is changed.

3. The apparatus of claim 2, wherein the spreading roller is shiftable between a first position, at which the fiber is vertically supplied to the first gap between the first roller and the second roller, and a second position, at which a predetermined maximum incident angle is formed, and is fixed at a shifted position.

4. The apparatus of claim 1, wherein the spreading roller adjusts the incident angle of the fiber from 0° to 30°.

5. The apparatus of claim 1, wherein the first roller and the second roller are formed of different materials, and either the first roller or the second roller has a surface formed of an elastic material.

6. The apparatus of claim 5, wherein either the first roller or the second roller, other than the roller having a surface formed of the elastic material, has a surface formed of a non-elastic material.

7. The apparatus of claim 5,
   wherein the third roller has a surface formed of a same material as a material of the surface of the first roller.

8. The apparatus of claim 7, wherein the material of the surfaces of the first roller and the third roller is rubber, and the material of the surface of the second roller is metal.

9. The apparatus of claim 7, wherein the material of the surfaces of the first roller and the third roller is metal, and the material of the surface of the second roller is rubber.

10. The apparatus of claim 1, further comprising:
    a krill around which the fiber is wound such that the fiber is supplied to the spreading roller; and
    a guide roller which is installed between the krill and the spreading roller to guide supply of the fiber.

11. The apparatus of claim 1, further comprising:
    a heater which heats the fiber passing through the two or more coating rollers;
    a cooling roller which cools the fiber passing through the heater; and
    a winder which winds the fiber passing through the cooling roller.

12. The apparatus of claim 1, wherein a vertical position of the spreading roller is maintained when the spreading roller is shifted by the transfer device.

* * * * *